United States Patent [19]

Smart

[11] Patent Number: 5,166,587

[45] Date of Patent: Nov. 24, 1992

[54] WINDSHIELD WIPER CONTROL SYSTEM RESPONSIVE TO VEHICLE SPEED

[75] Inventor: David C. Smart, Waterloo, Iowa

[73] Assignee: Deere & Company, Moline, Ill.

[21] Appl. No.: 790,793

[22] Filed: Nov. 12, 1991

[51] Int. Cl.⁵ .............................................. B60S 1/08
[52] U.S. Cl. ............................... 318/444; 318/DIG. 2
[58] Field of Search ................. 318/443, 444, DIG. 2; 15/250.12, 250.13, 250.16, 250.17; 307/9.1, 10.1; 364/424.05

[56] References Cited

U.S. PATENT DOCUMENTS

| | | |
|---|---|---|
| 4,336,482 | 6/1982 | Goertler et al. ................ 318/443 |
| 4,389,603 | 6/1983 | Kogawa et al. . |
| 4,419,611 | 12/1983 | Kawasaki et al. . |
| 4,588,935 | 5/1986 | Kaneiwa et al. ................ 318/483 |
| 4,689,535 | 8/1987 | Tsunoda et al. . |
| 4,881,019 | 11/1989 | Shiraishi . |
| 5,017,847 | 5/1991 | Leistenschneider . |

FOREIGN PATENT DOCUMENTS 1522521 8/1978 United Kingdom .
1561394 2/1980 United Kingdom .

Primary Examiner—Bentsu Ro

[57] ABSTRACT

A vehicle windshield wiper control system has an electrically driven wiper motor, a wiper control switch coupled to the motor and having a delay position wherein the motor operates intermittently, a vehicle speed sensor, and a control unit coupled to the control switch, the motor, and to the speed sensor. The control operation of the motor, the control unit periodically executes a method or algorithm which causes the system to vary the dwell time between motor operations as a function of sensed vehicle speed, and optionally as a function of an operator adjustable dwell time control.

5 Claims, 3 Drawing Sheets

WINDSHIELD WIPER CONTROL SYSTEM RESPONSIVE TO VEHICLE SPEED

BACKGROUND

This invention relates to a windshield wiper control system, and more particularly to such a system which is responsive to the speed of the vehicle.

In conditions where a light rain is falling on a windshield it is desirable that the vehicle windshield wipers operate intermittently. Otherwise, leaving the wipers on continuously may cause smearing and undue wear on the wiper blades. Commercially available windshield wiper control systems provide an intermittent operational mode wherein the windshield wiper blades will sweep intermittently. Typically, with such commercially available intermittent or time delay windshield wiper control systems, the operator has to continually manually adjust the dwell time (the time between the intermittent sweeps) of the windshield wiper blades in order to adapt to changing conditions. For example, as vehicle speed increases and more rain impacts the windshield, the operator would normally decrease the dwell time. Accordingly, a windshield wiper control systems which automatically compensates for changes in vehicle speed would be desirable. By sensing the vehicle speed, the dwell time can be reduced automatically as the speed increases. The operator no longer has to constantly change this manually. Vehicle speed responsive wiper control systems are known from U.S. Pat. No. 4,881,019, issued in 1989 to Siraishi et al, from U.S. Pat. No. 4,419,611, issued in 1983 to Kawasaki et al and from U.S. Pat. No. 5,017,847, issued in 1991 to Leistenschneider. However, none of these prior art systems takes advantage of the capabilities of microprocessor technology. Since microprocessors are increasingly available on modern vehicles to perform various other functions, it would be desirable to have a vehicle speed responsive intermittent wiper control system which takes advantage of microprocessor technology.

SUMMARY

An object of the present invention is to provide a microprocessor based windshield wiper control systems which automatically compensates for changes in vehicle speed.

These and other objects are achieved by the present invention wherein a vehicle windshield wiper control system has an electrically driven wiper motor, a wiper control switch coupled to the motor and having a delay position wherein the motor operates intermittently, a vehicle speed sensor, and a control unit coupled to the control switch, the motor, and to the speed sensor. To control operation of the motor, the control unit executes a method or algorithm which includes periodically repeating the following steps. First, the status of the operator control switch is checked, and if the operator control switch is not in its delay position, a dwell timer/counter is reset to an initial value and the wiper motor is deactivated. Otherwise, if the operator control switch is in its delay position the dwell timer/counter is incremented and then the status of the dwell timer/counter is compared to a minimum value. If the dwell timer/counter is less than the minimum value, the wiper motor is energized. If the dwell timer/counter is greater than the minimum value, a delay time value (representing a desired delay time between operations of the motor) is computed as a function of the vehicle velocity. Then the dwell timer/counter value is compared to the delay time value. If the dwell timer/counter value is greater than the delay time value, the dwell timer/counter is reset to its initial value and the wiper motor is deenergized. Otherwise, if the dwell timer/counter value is less than the delay time value, the wiper motor is deenergized.

BRIEF DESCRIPTION

DETAILED DESCRIPTION

Figure 1:
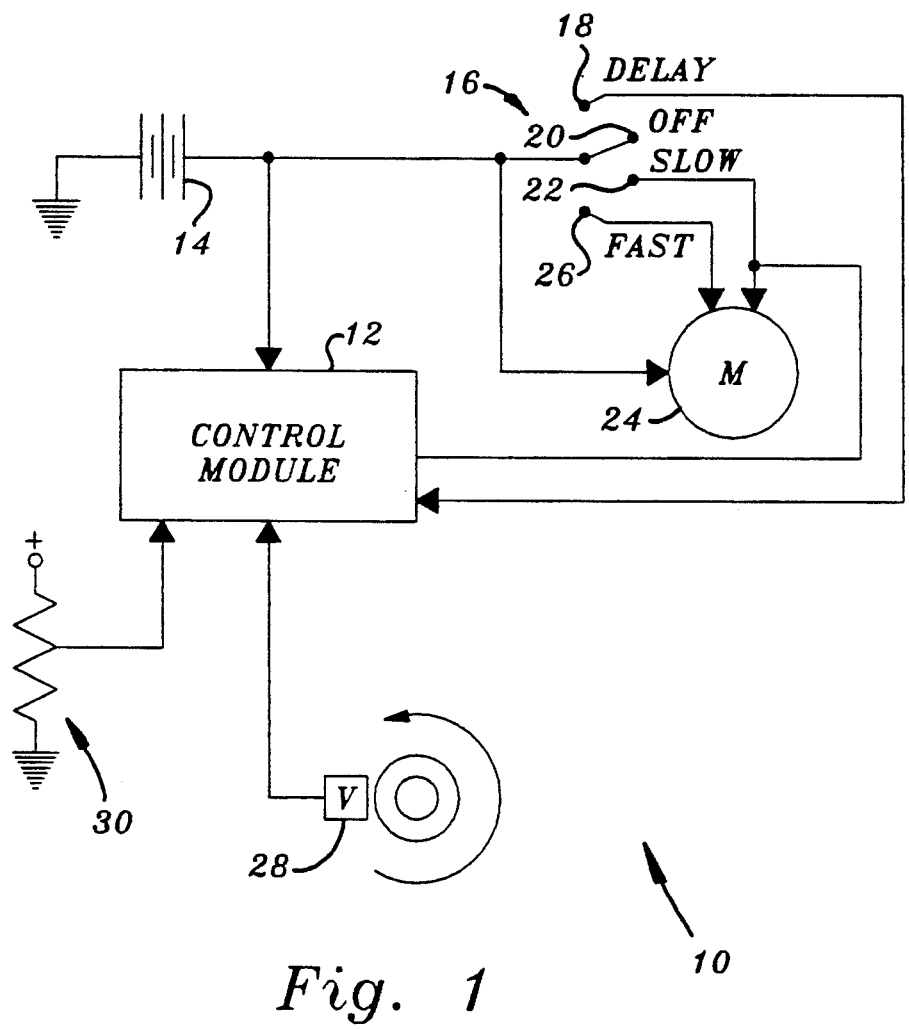
FIG. 1 is a simplified schematic diagram of a windshield wiper control system according to the present invention.

The windshield wiper control system 10 includes a control module 12, which preferably includes a commercially available programmable microprocessor (not shown). Electrical power from battery 14 is supplied to the control module 12 and to wiper control switch 16. The switch 16 has a "Delay" terminal 18 connected to an input of the control module 12, an unconnected "Off" terminal 20, a "Slow" terminal 22 connected to a slow speed input of the wiper motor 24 and connected to an input of the control module 12, and a "Fast" terminal 26 connected to a fast speed input of the wiper motor 24. A vehicle velocity sensor 28, is also connected to an input of the control module 12. The velocity sensor could be a wheel speed sensor, a transmission output shaft speed sensor, or some other sensor which provides a signal that is approximately proportional to vehicle velocity. Optionally, an operator adjustable dwell time control 30, such as a potentiometer, may be connected to an input of the control module 12.

The optional operator dwell time control 30 provides a signal to the time delay control module 12. The control module 12 alters the dwell time as a function of vehicle velocity as sensed by the velocity sensor 28. When the control switch is in its delay position, the control module 12 controls the application of power to the wiper motor 24 via the slow speed terminal 20. The power is applied for a long enough period of time such that the wipers (not shown) will always be returned to their rest position. The dwell time is adjusted based on the setting of operator dwell time control 30 and the vehicle velocity sensor 28. One example of the computation of total dwell time is shown in the following chart. It is not necessary that the relationship be linear, and a nonlinear function may be more appropriate.

Figure 2:
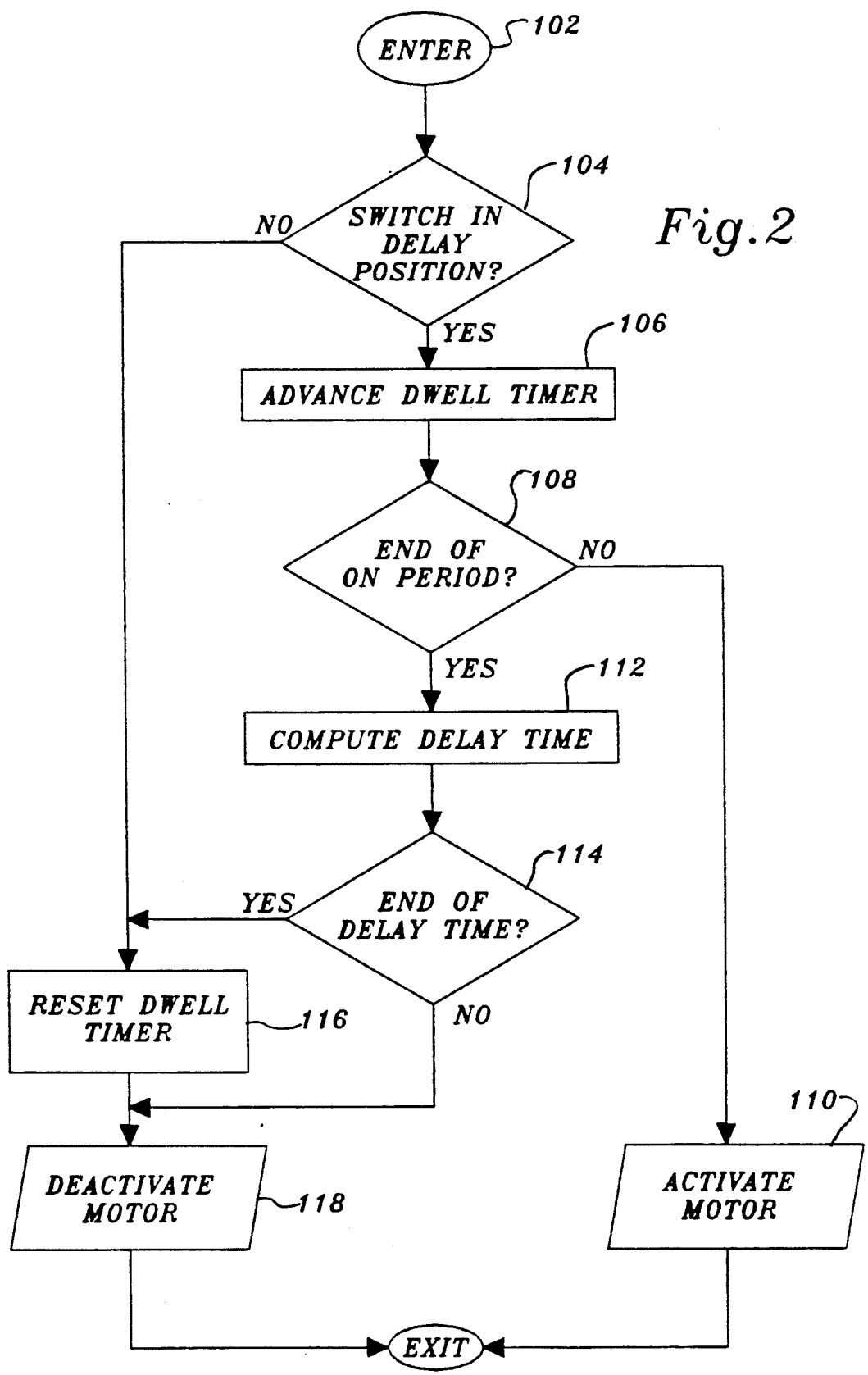
FIG. 2 is a logic flow diagram of an algorithm executed by the control system of the present invention.

The microprocessor (not shown) of the control module 12 is programmed to periodically execute an algorithm 100 such as illustrated by the logic flow diagram or flow chart of FIG. 2. Referring now to FIG. 2, the algorithm is entered periodically at step 102. Then, step 104 checks the status of the operator control switch 16, and if control switch 16 is not in its delay position, directs the algorithm to steps 116 and 118. Step 116 resets the dwell timer/counter to an initial value step 118 deactivates the slow speed input 22 of the wiper motor 24. The algorithm 100 is exited after step 118. Thus, as long as the control switch 16 is not in its delay position, the dwell timer/counter will be continually be reset to its initial value.

However, when the operator control switch 16 is placed in its delay position, then step 104 will direct the algorithm to step 106 which increments the dwell timer/counter. Then, step 108 checks the status of the dwell timer/counter. If the dwell timer/counter is less than a certain minimum value representing a minimum "ON" period, which is long enough for the motor 24 to return the wipers (not shown) to a home position, it is assumed that the wiper motor 24 should be energized or should remain energized, and step 108 directs the algorithm to step 110 which energizes the slower speed input 22 of the wiper motor 24. Otherwise, if the dwell timer/counter value is greater than the certain minimum value, then step 108 directs the algorithm to step 112.

Step 112 computes, as a function of the vehicle velocity, V, as sensed by sensor 28, a delay time value representing a desired delay time between operations of the motor 24 during its intermittent mode of operation. If there is no adjustable dwell time control 30, the delay time value, T-delay, will be determined according to an equation such as the following:

$$T\text{-}delay = Tmax - (C * V),$$

where Tmax represents a maximum desired dwell time at zero velocity (such as 12 seconds, for example) and where C is a constant such as 0.12.

With such an equation, the delay time value will vary linearly from a maximum value of 12 seconds at zero velocity to a value of 2 seconds at a velocity of 65 kph.

After the delay time value is computed in step 112, the algorithm proceeds to step 114. Step 114 compares the dwell timer/counter value to the delay time value computed in step 112. If the dwell timer/counter value has not attained a value equal to or greater than the computed delay time value, step 114 directs the algorithm to previously described step 118. Step 118 will deenergize the slow speed input of the wiper motor 24 without resetting the dwell timer/counter value. On the other hand, if the dwell timer/counter value is greater than the computed delay time value, step 114 directs the algorithm to steps 116 and 118, which resets the dwell timer/counter to its initial value and deenergizes the slow speed input of the wiper motor 24. Step 116 will reset the dwell timer/counter value so that steps 108 and 110 will energize the slow speed input of the wiper motor 24 during the next pass through the algorithm.

Figure 3:
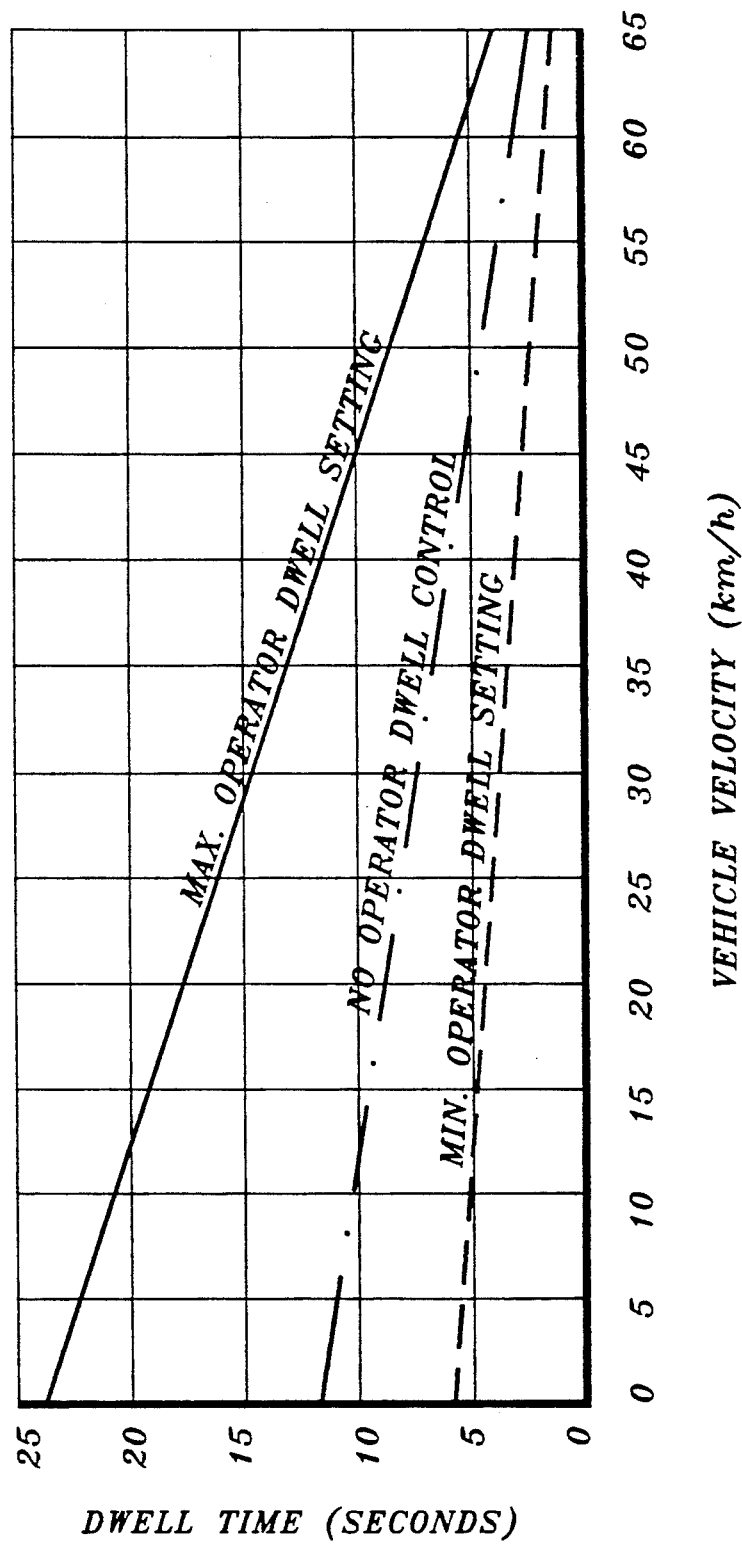
FIG. 3 is graphical representation of the relationship between dwell time and vehicle speed achieved by the present invention.

These steps are periodically repeated so that when the operator control switch is in its delay position, the wiper motor 24 will be intermittently energized and the dwell time between motor operations will vary linearly as a function of sensed vehicle velocity as illustrated by line A in FIG. 3.

Alternatively, if an operator adjustable dwell time control 30, such as a potentiometer, is connected to an input of the control module 12, then step 112 of the algorithm could be modified to compute the delay time value, as a function of the vehicle velocity, V, and as a function of the setting of the operator adjustable dwell time control 30. In this case, the dwell time between motor operations could vary as illustrated by the family of lines A, B and C in FIG. 3.

Someone with ordinary skill in the art of microprocessor programming could readily convert the algorithm described herein into a program which would be loaded into a programmable microprocessor.

While the invention has been described in conjunction with a specific embodiment, it is to be understood that many alternatives, modifications and variations will be apparent to those skilled in the art in light of the foregoing description. Accordingly, this invention is intended to embrace this and all other alternatives, modifications and variations which fall within the spirit and scope of the appended claims.

I claim:

1. In a vehicle windshield wiper control system having an electrically driven wiper motor having a speed input, an operator control switch coupled to the motor and having a delay position wherein the motor operates intermittently, a vehicle speed sensor, and a control unit coupled to the control switch, the motor, and to the speed sensor, a method of controlling operation of the motor, comprising the following steps:
   (1) checking the status of the operator control switch; and
      (a) if the operator control switch is not in its delay position, resetting a dwell timer/counter to an initial value and deactivating the wiper motor; else
      (b) if the operator control switch is in its delay position, incrementing the value of the dwell timer/counter;
   (2) checking the value of the dwell timer/counter; and
      (a) if the value of the dwell timer/counter is less than a minimum value, energizing the wiper motor; else
      (b) if the value of the dwell timer/counter is greater than said minimum value, computing, as a function of the vehicle velocity, a delay time value representing a desired delay time between operations of the motor;
   (3) comparing the value of the dwell timer/counter to the delay time value; and
      (a) if the value of the dwell timer/counter is greater than said delay time value, resetting the dwell timer/counter to its initial value and deenergizing the wiper motor; else
      (b) if the value of the dwell timer/counter is greater than said delay time value, deenergizng the wiper motor; and
   (4) periodically repeating steps (1)–(3).

2. The invention of claim 1, wherein:
   the control system further comprises an operator adjustable dwell time control for setting a variable dwell time during which the motor is inactive during its intermittent operational mode; and
   the delay time value is computed as a function of the vehicle velocity and the operator dwell time setting.

3. The invention of claim 2, wherein:
   the delay time value is computed as a linear function of the vehicle velocity.

4. The invention of claim 1, wherein:
   the delay time value is computed as a linear function of the vehicle velocity.

5. The invention of claim 1, wherein:
   the minimum value used in step 2 represents a period which is long enough for the motor to return to a home position.

* * * * *